(12) United States Patent
Kimba Dit Adamou et al.

(10) Patent No.: US 11,778,595 B2
(45) Date of Patent: *Oct. 3, 2023

(54) RESOURCE CONFIGURATION METHOD, TERMINAL AND BASE STATION

(71) Applicant: VIVO MOBILE COMMUNICATION CO., LTD., Guangdong (CN)

(72) Inventors: Boubacar Kimba Dit Adamou, Chang'an Dongguan (CN); Wei Bao, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,223

(22) Filed: Jan. 7, 2022

(65) Prior Publication Data

US 2022/0132472 A1      Apr. 28, 2022

Related U.S. Application Data

(63) Continuation of application No. 16/638,106, filed as application No. PCT/CN2018/099146 on Aug. 7, 2018, now Pat. No. 11,252,698.

(30) Foreign Application Priority Data

Aug. 11, 2017  (CN) .......................... 201710687303.9

(51) Int. Cl.
*H04W 72/04* (2023.01)
*H04W 72/0453* (2023.01)
*H04L 5/00* (2006.01)
*H04W 72/563* (2023.01)

(52) U.S. Cl.
CPC ........... *H04W 72/04* (2013.01); *H04L 5/0035* (2013.01); *H04W 72/0453* (2013.01); *H04W 72/563* (2023.01)

(58) Field of Classification Search
CPC ............. H04W 72/04; H04W 72/0453; H04W 72/563; H04W 72/06; H04L 5/0035
See application file for complete search history.

(56) References Cited

U.S. PATENT DOCUMENTS 10,749,644 B2 *  8/2020  Islam ................... H04W 72/121
11,252,698 B2 *  2/2022  Kimba Dit Adamou ....................
                                                        H04L 5/0035
(Continued)

FOREIGN PATENT DOCUMENTS

CN       105099634 A      11/2015
CN       106160973 A      11/2016

OTHER PUBLICATIONS

CN Office Action in Application No. 201710687303.9 dated Mar. 12, 2020.
(Continued)

*Primary Examiner* — Raj Jain
(74) *Attorney, Agent, or Firm* — Maschoff Brennan

(57) ABSTRACT

A resource configuration method, a terminal and a base station are provided. The resource configuration method applied to a terminal includes: receiving an activation state configuration command of a preconfigured bandwidth part (BWP) resource transmitted by a base station; configuring the resource of the BWP according to the activation state configuration command.

20 Claims, 6 Drawing Sheets

(56) References Cited

U.S. PATENT DOCUMENTS

| | | | |
|---|---|---|---|
| 2011/0003585 A1* | 1/2011 | Wang | H04M 1/72469 |
| | | | 455/418 |
| 2012/0076028 A1 | 3/2012 | Ko et al. | |
| 2017/0135105 A1 | 5/2017 | Li et al. | |
| 2017/0202025 A1* | 7/2017 | Ouchi | H04W 72/0446 |
| 2020/0092864 A1* | 3/2020 | Chen | H04W 72/23 |
| 2020/0245295 A1* | 7/2020 | Kimba Dit Adamou | |
| | | | H04W 72/0453 |

OTHER PUBLICATIONS

"Way Forward on bandwidth part fro efficient wideband operation in NR" 3GPP TSG-RAN WG1 #89, Media Tek, Huawei, HiSlicon, R1-1709736, May 15, 2017.
"On bandwidth adaptation" 3GPP TSG RAN WG1 NR Ad-Hoc Meeting, Huawei, HiSilicon, R1-1711424, Jun. 27, 2017.
"Discussion on Bandwidth Part Configurations" 3GPP TSG RAN WG1 Meeting Ad-Hoc, LG Electronics, R1-1711574, Jun. 27, 2017.
"Further Details on Wider Bandwidth Operations in NR" 3GPP TSG RAN WG1 NR Ad-Hoc#2, MediaTek Inc., R1-17010796, Jun. 27, 2017.
"RAN2 consideration for bandwidth part in NR" 3GPP TSG-RAN WG2 NR Ad-hoc#2 Meeting, Samsung, R2-1706427, Jun. 27, 2017.
CN Office Action in Application No. 16638106 dated Feb. 10, 2020.
Search Report in Application No. 18844193.5 dated Jun. 26, 2020.
Written Opinion and International Search Report in Application No. PCT/CN2018/099146 dated Feb. 27, 2020.

\* cited by examiner

RESOURCE CONFIGURATION METHOD, TERMINAL AND BASE STATION

CROSS-REFERENCE TO RELATED APPLICATION

This application claims the benefit of and is a continuation application of U.S. patent application Ser. No. 16/638,106 filed on Feb. 10, 2020 which is the U.S. national phase of PCT Application PCT/CN2018/099146 filed on Aug. 7, 2018, which claims a priority of priority to Chinese Patent Application No. 201710687303.9, filed on Aug. 11, 2017, which is incorporated herein by reference in its entirety.

TECHNICAL FIELD

The present disclosure relates to the field of communication technology, and in particular to a resource configuration method, a terminal and a base station.

BACKGROUND

In the New Radio (NR) Rel-15, the maximum channel bandwidth of each carrier is 400 MHZ. However, considering capabilities of a user equipment (UE, also called terminal), the maximum bandwidth supported by the UE may be less than 400 MHZ, and the UE may operate on a plurality of small bandwidth parts (BWPs). Each bandwidth part corresponds to a numerology, a bandwidth, and a frequency location. A base station needs to tell the UE on which BWP the UE operates, that is, which BWP is activated. The BWP may be activated or deactivated through signaling, such as Radio Resource Control (RRC), Downlink Control Information (DCI), Medium Access Control (MAC) layer control element (CE).

However, the related art does not clearly define a scheme of activation and deactivation by using the MAC CE, which results in incomplete communication processes and may not guarantee the reliability of network communication.

SUMMARY

A resource configuration method is provided in an embodiment of the present disclosure, applied to a terminal, including:
receiving an activation state configuration command of a preconfigured bandwidth part (BWP) resource transmitted by a base station;
configuring the resource of the BWP according to the activation state configuration command.

A resource configuration method is further provided in an embodiment of the present disclosure, applied to a base station, including:
transmitting an activation state configuration command of a preconfigured bandwidth part (BWP) resource.

A terminal is further provided in an embodiment of the present disclosure, including:
a first reception module, configured to receive an activation state configuration command of a preconfigured bandwidth part (BWP) resource transmitted by a base station;
a configuration module, configured to configure the resource of the BWP according to the activation state configuration command.

A terminal is further provided in an embodiment of the present disclosure, including a storage, a processor, and a program stored on the storage and executable on the processor, wherein the program is executed by the processor to perform the above-mentioned resource configuration method.

A computer readable storage medium is further provided in an embodiment of the present disclosure, wherein a computer program is stored on the computer readable storage medium, the computer program is executed by a processor to perform the above-mentioned resource configuration method.

A base station is further provided in an embodiment of the present disclosure, including:
a second transmission module, configured to transmit an activation state configuration command of a preconfigured bandwidth part (BWP) resource.

A base station is further provided in an embodiment of the present disclosure, including a storage, a processor, and a program stored on the storage and executable on the processor, wherein the program is executed by the processor to perform the above-mentioned resource configuration method.

A computer readable storage medium is further provided in an embodiment of the present disclosure, wherein a computer program is stored on the computer readable storage medium, the computer program is executed by a processor to perform the above-mentioned resource configuration method.

DETAILED DESCRIPTION

In order to make the objects, technical solutions and advantages of the present disclosure more clear, the present disclosure will be clearly and completely described in detail below with reference to the drawings of the specific embodiments.

The present disclosure provides a resource configuration method, a terminal, and a base station in response to the issues that the related art does not clearly define a scheme of activation and deactivation of a BWP which results in incomplete communication processes and influences the reliability of network communication.

Figure 1:
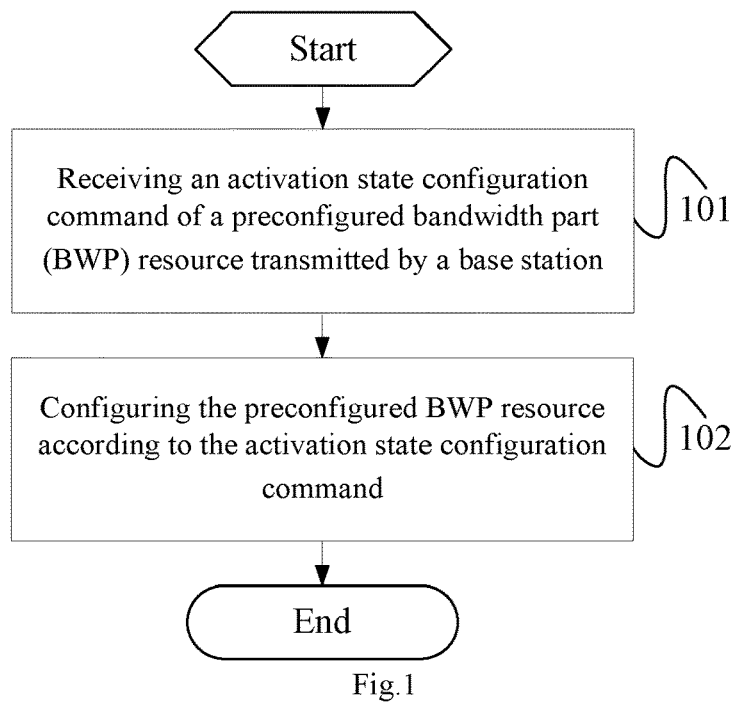
FIG. 1 is a first schematic flowchart illustrating a resource configuration method in an embodiment of the present disclosure.

As shown in FIG. 1, a resource configuration method is provided in an embodiment of the present disclosure, applied to a terminal, including steps 101 to 102.

Step 101: receiving an activation state configuration command of a preconfigured bandwidth part (BWP) resource transmitted by a base station.

It should be noted that the preconfigured BWP resource in the present embodiment refers to a resource of the BWP for uplink and/or downlink data transmission, or the preconfigured BWP resource refers to a logical channel (LCH) resource; the activation state configuration command refers to an activation command of the preconfigured BWP resource (that is, the terminal adjusts the preconfigured BWP resource from a deactivated state to an activated state after receiving the activation command), or the activation state configuration command refers to a deactivation command of the preconfigured BWP resource (that is, the terminal adjusts the preconfigured BWP resource from an activated state to a deactivated state after receiving the deactivation command).

Step 102: configuring the resource of the BWP according to the activation state configuration command.

The terminal adjusts a state of a preconfigured BWP resource according to an activation state configuration command. In a case that the activation state configuration command includes an activation command, the terminal performs activation configuration on the resource of the BWP according to the activation command, that is, adjusted from the deactivated state to the activated state; in a case that the activation state configuration command includes a deactivation command, the resource of the BWP is deactivated according to the deactivation command, that is, adjusted from the activated state to the deactivated state.

Specifically, the implementation of Step 101 includes:

receiving the activation state configuration command of the preconfigured BWP resource transmitted by the base station through a first preset message.

The first preset message includes at least one of: a Medium Access Control (MAC) layer control element (CE) and a Radio Resource Control (RRC) message.

It should be noted that, before the terminal receives the preset resources of the BWP, the terminal also needs to receive the configuration information of the resources of the BWP transmitted by the base station, and because the types of the preset resources of the BWP are different, the content of the configuration information of the resources of the BWP transmitted by the base station is also differences. In the following, the configuration information of BWP resources will be described in detail from two aspects: the preset resources of the BWP are the resources of the BWP for uplink and/or downlink data transmission and the preset resources of the BWP are the LCH resources of the resources of the BWP.

1. In a case that Step 101 specifically includes: receiving the activation state configuration command of the resource of the BWP used for uplink and/or downlink data transmission transmitted by the base station, prior to Step 101, the method further includes:

receiving first configuration information of the BWP transmitted by the base station.

The first configuration information includes at least one of: timing duration of a timer, a BWP index, a BWP cell index, and a frequency domain location of the BWP (the frequency domain location indicates which frequency band the BWP belongs to in the frequency domain).

It should be noted that, the first configuration information is usually transmitted by the base station through a second preset message.

The second preset message includes at least one of: an MAC layer CE, an RRC message, Packet Data Convergence Protocol (PDCP) control signaling and physical layer indication signaling.

Specifically, in a case that the terminal employs the MAC layer CE to transmit the first configuration information, the MAC layer CE includes:

an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

Figure 2:
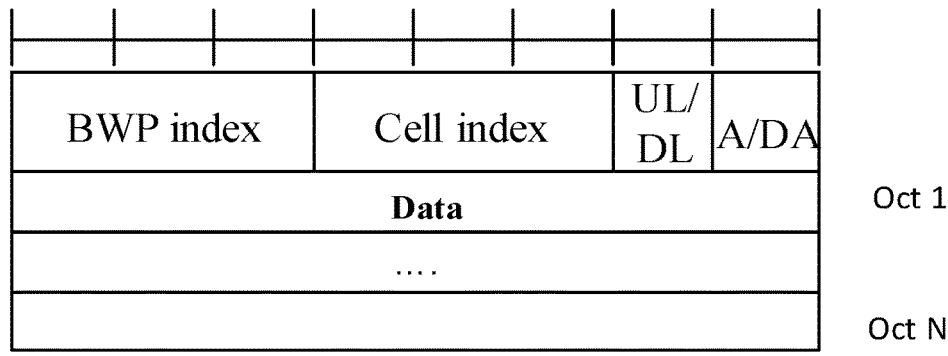
FIG. 2 is a first schematic diagram illustrating a format of an MAC layer CE.

As shown in FIG. 2, the first format of the MAC layer CE is set as follows: the first byte of the MAC layer CE header includes: the BWP index with a 3-bit length, the cell index with a 3-bit length, the uplink and downlink indication information (UL/DL, where the UL represents uplink and the DL represents downlink) with a 1-bit length and the activation state of the BWP with a 1-bit length (A/DA, where A represents active and DA represents deactivated). The remaining 1 to N bytes carry information related to the MAC layer CE header of the BWP required to be activated or deactivated.

Specifically, in a case that the terminal transmits the first configuration information through the MAC layer CE, the MAC layer CE includes:

an indication bit configured to indicate the timing duration of the timer, an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

Figure 3:
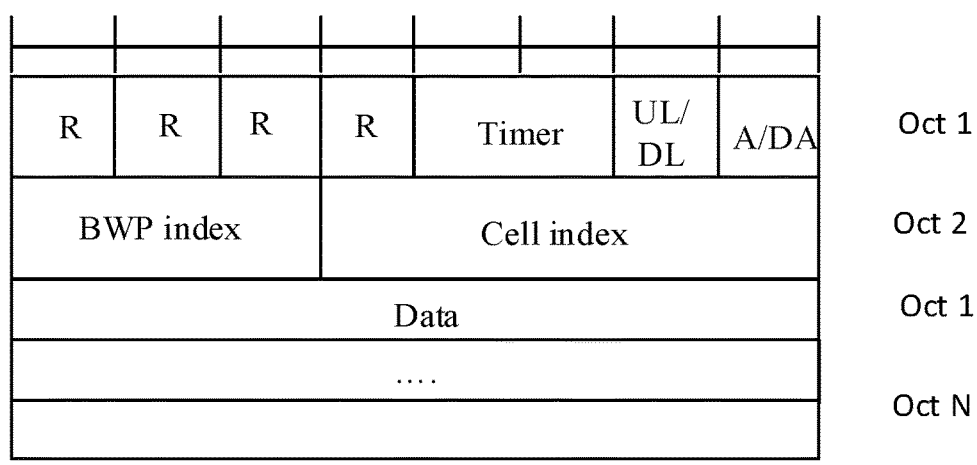
FIG. 3 is a second schematic diagram illustrating a format of an MAC layer CE.

As shown in FIG. 3, the second format of the MAC layer CE is set as follows: the first byte and the second byte of the MAC layer CE header include: reserved 5 bits (or permitted to indicate other BWP-related information), the timing duration of the timer with a 2-bit length, the BWP index with a 3-bit length, the cell index with a 5-bit length, the UL/DL with a 1-bit length, and the A/DA with a 1-bit length. The remaining 1 to N bytes carry information related to the MAC layer CE header of the BWP required to be activated or deactivated.

It should be noted that the format of the first MAC layer CE does not include the timing duration of the timer, that is, the first configuration information does not include the timing duration of the timer. In this case, in a case that the terminal receives the activation state configuration command, the terminal configures the resource of the BWP immediately. The first format of the MAC layer CE includes the timing duration of the timer, that is, in a case that the first configuration information includes the timing duration of the timer, it is indicated that the terminal will not immediately configure the resource of the BWP in a case that the terminal receives the activation state configuration command, but instead performs configuration (i.e., the delay configuration for the resource of the BWP) after the timer expires.

Specifically, the terminal may control timing time by starting a timer. Therefore, the specific implementation of Step 102 includes: starting the timer according to the timing duration of the timer in a case that the first configuration information includes the timing duration of the timer; configuring the resource of the BWP according to the activation state configuration command in a case that the timer expires.

The following takes the activation state configuration command as the activation command and takes the activation state configuration command as the deactivation command as examples respectively to specifically illustrate the foregoing implementation of the present disclosure as follows.

Case 1, activating the uplink and downlink of the BWP in a network 1.1 The base station issues configuration information of the resource of the BWP to the terminal, the configuration information includes: timing duration of a timer, a BWP index, a BWP cell index, and a frequency domain location of the BWP, and the configuration information is carried by an MAC layer CE, an RRC message, PDCP control signaling or physical layer indication signaling.

1.2. The base station issues a command for activating the uplink and downlink of the BWP to the terminal.

1.3. The terminal starts a deactivation timer in a case that the terminal receives the command for activating the uplink and downlink of the BWP issued by the base station.

1.4. In a case that the deactivation timer expires, the terminal activates the uplink and downlink of the BWP.

Case 2, deactivating the uplink and downlink of the BWP in a network 2.1 The base station issues configuration information of the resource of the BWP to the terminal, the configuration information includes: timing duration of a timer, a BWP index, a BWP cell index, and a frequency domain location of the BWP, and the configuration information is carried by an MAC layer CE, an RRC message, a PDCP control signaling or a physical layer indication signaling.

2.2. The base station issues a command for deactivating uplink and downlink of the BWP to the terminal.

2.3. The terminal starts an activation timer in a case that the terminal receives the command for deactivating the uplink and downlink of the BWP issued by the base station.

2.4. In a case that the activation timer expires, the terminal deactivates the uplink and downlink of the BWP.

2. In a case that Step 101 specifically includes: receive an activation state configuration command of a Logical Channel (LCH) resource of the resource of the BWP transmitted by the base station, prior to Step 101, the method further includes:

receiving second configuration information of the BWP transmitted by the base station.

The second configuration information includes at least one of: timing duration of a timer, a BWP index, a BWP cell index, an LCH identity in the BWP, bitmap information and a frequency domain location of the BWP.

It should be noted that the bitmap information refers to the setting information of the LCH in the BWP for activation or deactivation configuration.

It should be noted that, the second configuration information is usually transmitted by the base station through a third preset message.

The third preset message includes at least one of: an MAC layer CE, an RRC message, PDCP control signaling and physical layer indication signaling.

Specifically, in a case that the terminal employs the MAC layer CE to transmit the second configuration information, the MAC layer CE includes:

an indication bit configured to indicate the BWP index, an indication bit configured to indicate the BWP cell index, an indication bit configured to indicate the LCH identity and an indication bit configured to indicate an activation state of the BWP; a data portion carrying information related to an MAC layer CE header.

Figure 4:
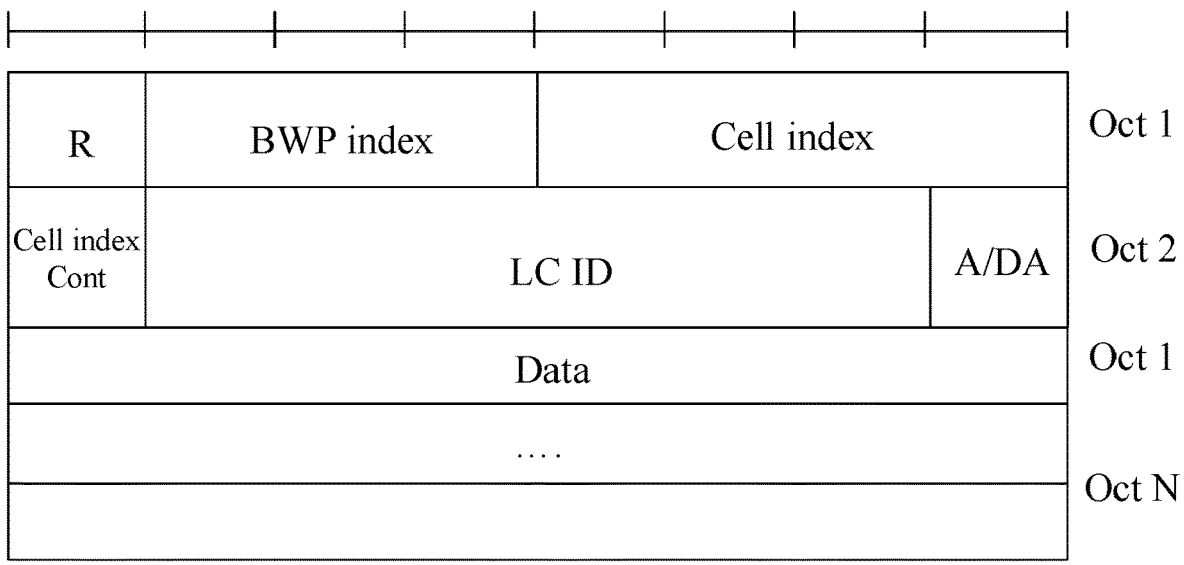
FIG. 4 is a third schematic diagram illustrating a format of an MAC layer CE.

As shown in FIG. 4, the first format of the MAC layer CE is set as follows: the first byte and the second byte of the MAC byte CE header include: reserved 1 bit (or permitted to indicate other BWP-related information), the BWP index with a 3-bit length, the cell index with a 5-bit length, the Logical Channel Identity (LCID) with a 6-bit length and the A/DA with a 1-bit length; the remaining 1 to N bytes carry the information related to the MAC layer CE header of the LCH in the BWP required to be activated or deactivated.

Specifically, in a case that the terminal employs the MAC layer CE to transmit the second configuration information, the MAC layer CE includes:

an indication bit configured to indicate the LCH identity and an indication bit configured to indicate the BWP index; a data portion carrying bitmap information of an LCH in the configured BWP.

Figure 5:
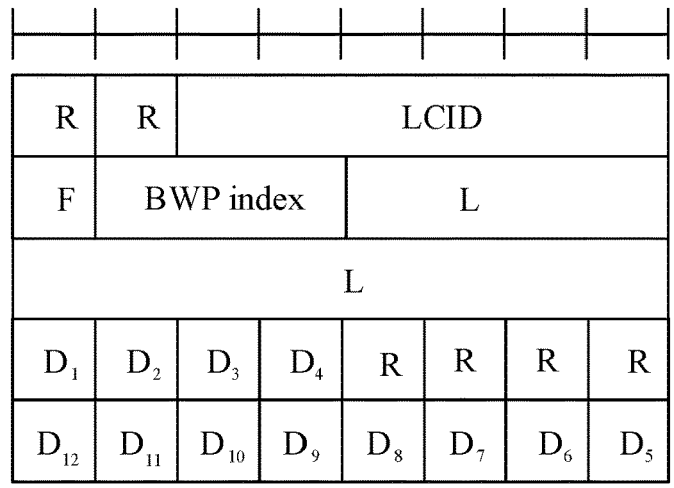
FIG. 5 is a fourth schematic diagram illustrating a format of an MAC layer CE.

As shown in FIG. 5, the second format of the MAC layer CE is set as follows: the first byte, the second byte and the third byte of the MAC layer CE header include: reserved 2 bits (or permitted to indicate other BWP-related information), the LCID with a 6-bit length, an 1-bit configured to indicate whether the length of the BWP index is variable, and the preset bit of the second byte configured to indicate the BWP index. The remaining bytes carry bitmap information Di of the LCH in the BWP required to be activated or deactivated. The Di equals 1 to activate the LCH, the Di equals 0 to deactivate the LCH; and the remaining 4 bits are reserved bits.

The specific implementation process in this case is as follows.

3.1 The base station issues configuration information of the resource of the BWP to the terminal, the configuration information includes: timing duration of a timer, a BWP index, a BWP cell index, an LCH identity in the BWP, bitmap information and a frequency domain location of the BWP, and the configuration information is carried by an MAC layer CE, an RRC message, PDCP control signaling or physical layer indication signaling.

3.2. The base station issues command for activating/deactivating the LCH resource of the resource of the BWP to the terminal.

3.3. In a case that the terminal receives the command for activating/deactivating the LCH resource of the resource of the BWP issued by the base station, the terminal activates/deactivates the corresponding LCH resource.

It should be noted that the foregoing describes the way in which the base station actively configures the activation/deactivation, and the terminal may also actively request whether to activate/deactivate the preconfigured BWP resource according to its own application requirements. The specific way is: prior to Step 101, transmitting configuration request information of the preconfigured BWP resource to the terminal.

Specifically, the configuration request information includes at least one of: a BWP index, a BWP index, and an LCH identity in the BWP.

Specifically, the terminal transmits the configuration request information of the preset resource to the base station through a fourth preset message;

The fourth preset message includes at least one of: an MAC layer CE and an RRC message.

In the following, the terminal requests for activating and deactivating some LCHs of the BWP respectively as examples, the above cases are illustrated as follows.

a: The terminal requests for activating some LCHs of the BWP a1: The base station issues configuration information of the resource of the BWP to the terminal, the configuration information includes: a BWP index, a BWP cell index, an LCH identity in the BWP, bitmap information and a frequency domain location of the BWP, and the configuration information is carried by an MAC layer CE, an RRC message, PDCP control signaling or physical layer indication signaling.

a2: In a case that the terminal, in a cell of a BWP, needs to request additional resources (for example, some LCH resources are limited or the uplink resources are insufficient), the terminal initiates a request for activating a LCH resource of a BWP (including the uplink and downlink of the LCH resource) to the base station.

a3: In a case that the base station receives the request for activating the LCH resource of the BWP from the terminal, the base station may issue the activable LCH resource of the BWP to the terminal according to the BWP resource situation of the network. The command issued by the base station may be carried through the RRC, the MAC layer CE, or the downlink control information (DCI).

a4: The terminal activates the corresponding LCH resource of the BWP according to the activatable LCH resource of the BWP issued by the base station.

b: the terminal requests for deactivating some LCHs of the BWP.

b1: In a case that the terminal has configured and activated some LWPs of the BWP, in a case that the terminal is in a BWP cell, some BWP resources may not be used normally (such as interference and other problems), the terminal initiates a request for deactivating a LCH resource of a BWP (including the uplink and downlink of the LCH resource) to the base station.

b2: In a case that the base station receives the request for deactivating the LCH resource of the BWP from the terminal, the base station may issue the deactivatable LCH resource of the BWP to the terminal according to the network BWP resource situation. The command issued by the base station may be carried through the RRC, the MAC layer CE, or the DCI.

b3: The terminal deactivates the corresponding BWP LCH resource according to the deactivatable LCH resource of the BWP issued by the base station.

It should be noted that, according to the embodiment of the present disclosure, an activation state configuration command of a preconfigured BWP resource transmitted by a base station is received; the resource of the BWP according to the activation state configuration command is configured, thereby achieving the state control of the BWP, improving the communication process, and guaranteeing the reliability of network communication.

Figure 6:
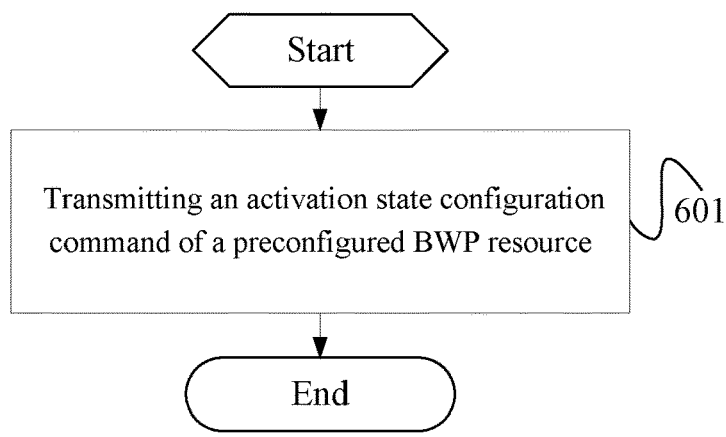
FIG. 6 is a second schematic flowchart illustrating a resource configuration method in an embodiment of the present disclosure.
Figure 7:
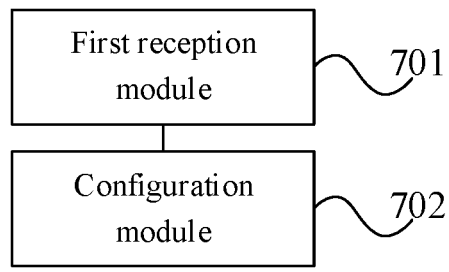
FIG. 7 is a first schematic diagram illustrating modules of a terminal in an embodiment of the present disclosure.
Figure 8:
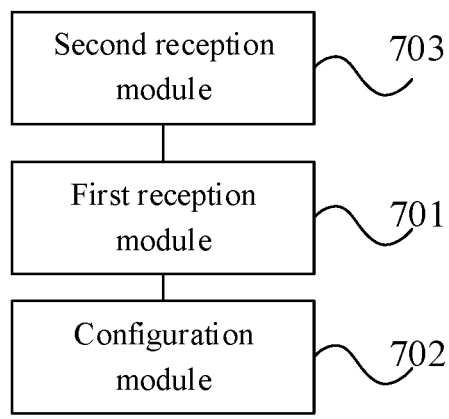
FIG. 8 is a second schematic diagram illustrating modules of a terminal in an embodiment of the present disclosure.
Figure 9:
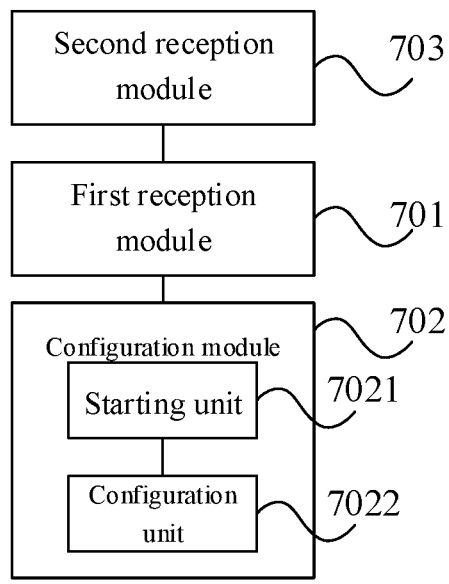
FIG. 9 is a third schematic diagram illustrating modules of a terminal in an embodiment of the present disclosure.
Figure 10:
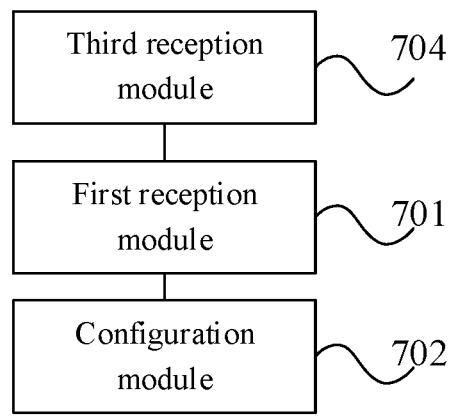
FIG. 10 is a fourth schematic diagram illustrating modules of a terminal in an embodiment of the present disclosure.
Figure 11:
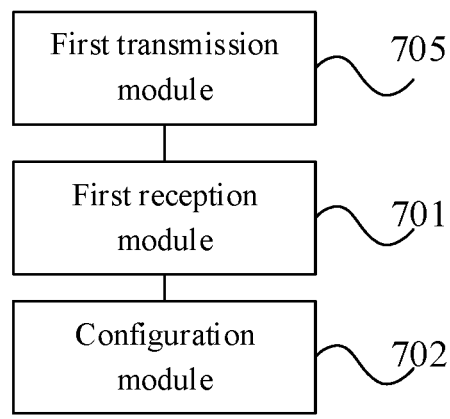
FIG. 11 is a fifth schematic diagram illustrating modules of a terminal in an embodiment of the present disclosure.

As shown in FIG. 6, a resource configuration method is provided in an embodiment of the present disclosure, applied to a base station, including:

Step 601: transmitting an activation state configuration command of a preconfigured bandwidth part (BWP) resource.

Specifically, Step 601 further includes:

transmitting the activation state configuration command of the preconfigured BWP resource to a terminal through a first preset message.

The first preset message includes at least one of: a Medium Access Control (MAC) layer control element (CE) and a Radio Resource Control (RRC) message.

Optionally, prior to Step 601, the method further includes:

transmitting first configuration information of the BWP to a terminal.

The preconfigured BWP resource includes: the resource of the bandwidth part (BWP) used for uplink and/or downlink data transmission; the first configuration information includes at least one of: timing duration of a timer, a BWP index, a BWP cell index, and a frequency domain location of the BWP.

Specifically, the transmitting the first configuration information of the BWP to the terminal includes:

transmitting the first configuration information to the terminal through a second preset message.

The second preset message includes at least one of: an MAC layer CE, an RRC message, Packet Data Convergence Protocol (PDCP) control signaling and physical layer indication signaling.

Optionally, in a case that the second preset message is the MAC layer CE, the MAC layer CE includes:

an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

Optionally, in a case that the second preset message is the MAC layer CE, the MAC layer CE includes:

an indication bit configured to indicate the timing duration of the timer, an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

Specifically, prior to Step 601, the method further includes:

transmitting second configuration information of the BWP to a terminal.

The preconfigured BWP resource includes: a Logical Channel (LCH) resource of the resource of the BWP, the second configuration information includes at least one of: timing duration of a timer, a BWP index, a BWP cell index, an LCH identity in the BWP, bitmap information and a frequency domain location of the BWP.

Specifically, the transmitting the second configuration information of the BWP to the terminal includes:

transmitting the second configuration information to the terminal through a third preset message.

The third preset message includes at least one of: an MAC layer CE, an RRC message, PDCP control signaling and physical layer indication signaling.

Optionally, in a case that the third preset message is the MAC layer CE, a format of the MAC layer CE includes:

an indication bit configured to indicate the BWP index, an indication bit configured to indicate the BWP cell index, an indication bit configured to indicate the LCH identity and an indication bit configured to indicate an activation state of the BWP; a data portion carrying information related to an MAC layer CE header.

Optionally, in a case that the third preset message is the MAC layer CE, a format of the MAC layer CE includes:

an indication bit configured to indicate the LCH identity and an indication bit configured to indicate the BWP index; a data portion carrying bitmap information of an LCH in the configured BWP.

Optionally, prior to Step 601, the method further includes:

receiving configuration request information of the preconfigured BWP resource transmitted by a terminal.

The configuration request information includes at least one of: a BWP index, a BWP index, and an LCH identity in the BWP.

Specifically, the receiving the configuration request information, transmitted by the terminal, of the preconfigured BWP resource includes:

receiving configuration request information of the preconfigured BWP resource transmitted by a terminal through a fourth preset message.

The fourth preset message includes at least one of: an MAC layer CE and an RRC message.

It should be noted that all the descriptions about the base station side in the foregoing embodiments are applicable to the embodiment applied to the resource configuration method at the base station side, and the same technical effects may also be achieved.

As shown in FIG. 7 to FIG. 11, a terminal is provided in an embodiment of the present disclosure, including:

a first reception module 701, configured to receive an activation state configuration command of a preconfigured bandwidth part (BWP) resource transmitted by a base station;

a configuration module 702, configured to configure the resource of the BWP according to the activation state configuration command.

Further, the first reception module 701 is configured to:

receive the activation state configuration command of the preconfigured BWP resource transmitted by the base station through a first preset message.

The first preset message includes at least one of: a Medium Access Control (MAC) layer control element (CE) and a Radio Resource Control (RRC) message.

Specifically, the first reception module 701 is configured to:

receive the activation state configuration command of the resource of the bandwidth part (BWP) used for uplink and/or downlink data transmission transmitted by the base station;

The terminal further includes:

a second reception module 703, configured to receive first configuration information of the BWP transmitted by the base station.

The first configuration information includes at least one of: timing duration of a timer, a BWP index, a BWP cell index, and a frequency domain location of the BWP.

Further, the configuration module 702 includes:

a starting unit 7021, configured to start the timer according to the timing duration of the timer in a case that the first configuration information includes the timing duration of the timer;

a configuration unit 7022, configured to configure the resource of the BWP according to the activation state configuration command in a case that the timer expires.

Further, the second reception module 703 is configured to:

receive the first configuration information transmitted by the base station through a second preset message.

The second preset message includes at least one of: an MAC layer CE, an RRC message, Packet Data Convergence Protocol (PDCP) control signaling and physical layer indication signaling.

Optionally, in a case that the second preset message is the MAC layer CE, the MAC layer CE includes:

an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

Optionally, in a case that the second preset message is the MAC layer CE, the MAC layer CE includes:

an indication bit configured to indicate the timing duration of the timer, an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

Specifically, the first reception module 701 is configured to:

receive an activation state configuration command of a Logical Channel (LCH) resource of the resource of the BWP transmitted by the base station;

The terminal further includes:

a third reception module 704, configured to receive second configuration information of the BWP transmitted by the base station.

The second configuration information includes at least one of: timing duration of a timer, a BWP index, a BWP cell index, an LCH identity in the BWP, bitmap information and a frequency domain location of the BWP.

Specifically, the third reception module 704 is configured to:

receive the second configuration information transmitted by the base station through a third preset message.

The third preset message includes at least one of: an MAC layer CE, an RRC message, PDCP control signaling and physical layer indication signaling.

Optionally, in a case that the third preset message is the MAC layer CE, a format of the MAC layer CE includes:

an indication bit configured to indicate the BWP index, an indication bit configured to indicate the BWP cell index, an indication bit configured to indicate the LCH identity and an indication bit configured to indicate an activation state of the BWP; a data portion carrying information related to an MAC layer CE header.

Optionally, in a case that the third preset message is the MAC layer CE, the MAC layer CE includes:

an indication bit configured to indicate the LCH identity and an indication bit configured to indicate the BWP index; a data portion carrying bitmap information of an LCH in the configured BWP.

Further, the terminal further includes:

a first transmission module 705, configured to transmit configuration request information of the preconfigured BWP resource to the terminal.

Specifically, the configuration request information includes at least one of: a BWP index, a BWP index, and an LCH identity in the BWP.

Specifically, the first transmission module 705 is configured to:

transmit the configuration request information of the preconfigured resource to the base station through a fourth preset message;

The fourth preset message includes at least one of: an MAC layer CE and an RRC message.

Specifically, the configuration module 702 is configured to:

perform, in a case that the activation state configuration command includes an activation command, an activation configuration on the resource of the BWP according to the activation command; or perform, in a case that the activation state configuration command includes a deactivation command, a deactivation configuration on the resource of the BWP according to the deactivation command.

It should be noted that the embodiment of the terminal is a terminal corresponding to the above-mentioned resource configuration method applied at a terminal side. All implementations of the above embodiments are applicable to the embodiment of the terminal, and the same technical effects may be achieved.

A terminal is further provided in an embodiment of the present disclosure, including: a storage, a processor and a computer program stored in the storage and executable on the processor, the computer program is executed by the processor to implement various processes in the foregoing resource configuration method embodiment applied at a terminal side, and the same technical effect may be achieved, which will not be repeated herein to avoid repetition.

A computer readable storage medium is further provided in the present disclosure, wherein the computer program is stored on the computer readable storage medium, and the computer program is executed by a processor to implement various processes in the foregoing resource configuration method embodiment applied at a terminal side, and the same technical effect may be achieved, which will not be repeated herein to avoid repetition. The computer readable storage medium may be, for example, a Read-Only Memory (ROM), a Random Access Memory (RAM), a magnetic disk or an optical disk, etc.

Figure 12:
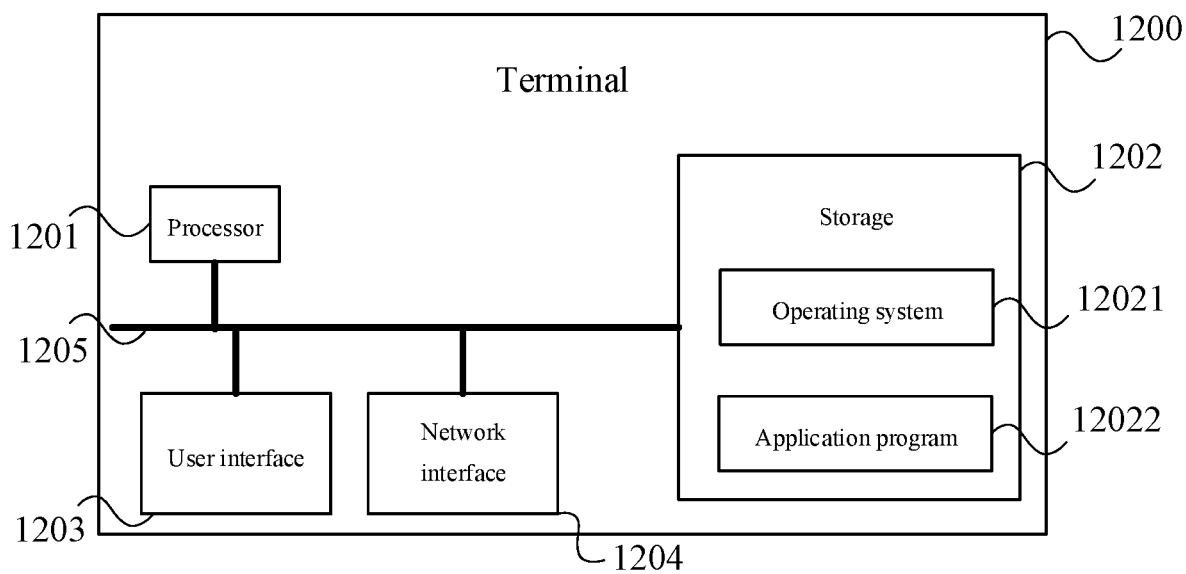
FIG. 12 is a structural block diagram of a terminal in an embodiment of the present disclosure.
Figure 13:
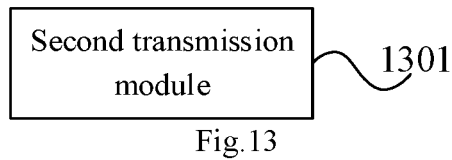
FIG. 13 is a first schematic diagram illustrating a module of a base station in an embodiment of the present disclosure.
Figure 14:
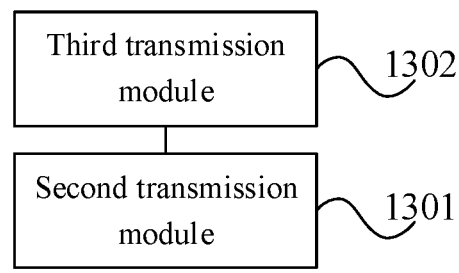
FIG. 14 is a second schematic diagram illustrating modules of a base station in an embodiment of the present disclosure.
Figure 15:
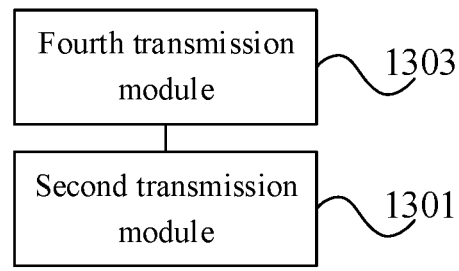
FIG. 15 is a third schematic diagram illustrating modules of a base station in an embodiment of the present disclosure.
Figure 16:
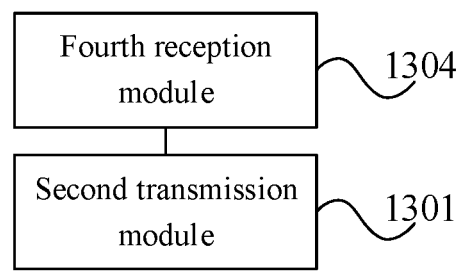
FIG. 16 is a fourth schematic diagram illustrating modules of a base station in an embodiment of the present disclosure.

As shown in FIG. 12, a structure of a terminal in an embodiment of the present disclosure is illustrated. The application entity of the resource configuration method of the present disclosure will be specifically described below with reference to the figure.

The terminal 1200 shown in FIG. 12 includes: at least one processor 1201, a storage 1202, at least one network interface 1204 and a user interface 1203. The various components in terminal 1200 are coupled together by a bus system 1205. It will be appreciated that the bus system 1205 is configured to enable connection communication between these components. The bus system 1205 includes a power bus, a control bus, and a status signal bus in addition to the data bus. However, for clarity of description, various buses are labeled as the bus system 1205 in FIG. 12.

The user interface 1203 may include a display, a keyboard, or a point-and-click device (e.g., a mouse), a track ball, a touchpad, or a touch screen, etc.

It is to be understood that the storage 1202 in this disclosure may be either a volatile storage or a non-volatile storage, or may include both the volatile and the non-volatile storage. The non-volatile storage may be a Read-Only Memory (ROM), a Programmable ROM (PROM), an Erasable PROM (EPROM), or an Electrically EPROM (EEPROM) or a flash memory. The volatile storage may be a Random Access Memory (RAM) that acts as an external cache. By way of example and not limitation, many forms of RAM are available, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The storage 1202 of the systems and methods described in the present disclosure is intended to include, but is not limited to, these and any other suitable types of storages.

In some embodiments, the storage 1202 stores the following elements, executable modules or data structures, or a subset thereof, or extended set thereof: an operating system 12021 and an application program 12022.

The operating system 12021 includes various system programs, such as a framework layer, a core library layer, a driver layer, and the like, for implementing various basic services and processing hardware-based tasks. The application program 12022 includes various application programs, such as a media player, a browser, and the like, for implementing various application services. A program implementing the methods of embodiments of the present disclosure may be included in the application program 12022.

In the embodiment of the present disclosure, the mobile terminal 1200 further includes: a computer program stored in the storage 1202 and executable on the processor 1201, specifically, which may be a computer control program in the application program 12022, the computer program is executed by the processor 1201 to implement the following steps: receiving an activation state configuration command of a preconfigured bandwidth part (BWP) resource transmitted by a base station; configuring the resource of the BWP according to the activation state configuration command.

The above method disclosed in the embodiment of the present disclosure may be applied to the processor 1201 or implemented by the processor 1201. The processor 1201 may be an integrated circuit chip having a processing capability of signals. During an implementation process, steps of the method may be realized in form of hardware by integrated logical circuits in the processor 1201, or in form of software by instructions. The processor 1201 may be a general purpose processor, digital signal processor (DSP), application specific integrated circuit (ASIC), field programmable gate array (FPGA) or other programmable logic device, discrete gate or transistor logic device, discrete hardware component. Various method, step, and logical block diagram disclosed in the embodiment of the present disclosure may be implemented or carried out. The general purpose processor may be a microprocessor, any conventional processor, etc. The steps of the methods disclosed with reference to the embodiments of the present disclosure may be embodied in hardware in the form of a coding processor, or performed by the hardware in the coding processor and the software modules in combination. The software modules may reside in well-established computer readable storage medium in the art, such as a RAM, flash memory, ROM, PROM or EEPROM, register. The computer readable storage medium resides in the storage 1202. The processor 1201 reads information from the storage 1202 and performs the steps of the methods with its hardware. Specifically, a computer program is stored on the computer readable storage medium. In a case that the computer program is executed by the processor 1201, the following steps are implemented.

It is to be understood that the embodiments described in embodiments of the present disclosure may be implemented in hardware, software, firmware, middleware, microcode, or any combination thereof. For hardware implementation, processing units may be implemented in one or more application specific integrated circuits (ASIC), digital signal processor (DSP), DSP device (DSPD), programmable logic device (PLD), field programmable gate array (FPGA), general purpose processor, controller, microcontroller, microprocessor, other electronic unit configured to perform the function described in the present disclosure or a combination thereof.

For software implementation, the techniques described in the present disclosure may be implemented by modules (e.g., procedures, functions, etc.) that perform the functions described in the present disclosure. The software code may be stored in the storage and executed by the processor. The storage may be implemented within the processor or external to the processor.

Optionally, the computer program is executed by the processor 1201 to implement: receiving the activation state configuration command of the preconfigured BWP resource transmitted by the base station through a first preset message;

The first preset message includes at least one of: a Medium Access Control (MAC) layer control element (CE) and a Radio Resource Control (RRC) message.

Optionally, the computer program is executed by the processor 1201 to implement: receiving the activation state configuration command of the resource of the BWP used for uplink and/or downlink data transmission transmitted by the base station; prior to receiving the activation state configuration command of the resource of the BWP used for the uplink and/or downlink data transmission transmitted by the base station, the computer program is executed by the processor 1201 to implement:

receiving first configuration information of the BWP transmitted by the base station.

The first configuration information includes at least one of: timing duration of a timer, a BWP index, a BWP cell index, and a frequency domain location of the BWP.

Optionally, the computer program is executed by the processor 1201 to implement: starting the timer according to the timing duration of the timer in a case that the first configuration information includes the timing duration of the timer;

configuring the resource of the BWP according to the activation state configuration command in a case that the timer expires.

Optionally, the computer program is executed by the processor 1201 to implement: receive the first configuration information transmitted by the base station through a second preset message.

The second preset message includes at least one of: an MAC layer CE, an RRC message, Packet Data Convergence Protocol (PDCP) control signaling and physical layer indication signaling.

Further, in a case that the second preset message is the MAC layer CE, the MAC layer CE includes:

an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

Further, in a case that the second preset message is the MAC layer CE, the MAC layer CE includes:

an indication bit configured to indicate the timing duration of the timer, an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

Optionally, the computer program is executed by the processor 1201 to implement: receiving an activation state configuration command of a Logical Channel (LCH) resource of the resource of the BWP transmitted by the base station;

Prior to receiving the activation state configuration command of the Logical Channel (LCH) resource of the resource of the BWP transmitted by the base station, the computer program is executed by the processor 1201 to implement:

receiving second configuration information of the BWP transmitted by the base station.

The second configuration information includes at least one of: timing duration of a timer, a BWP index, a BWP cell index, an LCH identity in the BWP, bitmap information and a frequency domain location of the BWP.

Optionally, the computer program is executed by the processor 1201 to implement: receiving the second configuration information transmitted by the base station through a third preset message;

The third preset message includes at least one of: an MAC layer CE, an RRC message, PDCP control signaling and physical layer indication signaling.

Further, in a case that the third preset message is the MAC layer CE, a format of the MAC layer CE includes:

an indication bit configured to indicate the BWP index, an indication bit configured to indicate the BWP cell index, an indication bit configured to indicate the LCH identity and an indication bit configured to indicate an activation state of the BWP; a data portion carrying information related to an MAC layer CE header.

Further, in a case that the third preset message is the MAC layer CE, the MAC layer CE includes:

an indication bit configured to indicate the LCH identity and an indication bit configured to indicate the BWP index; a data portion carrying bitmap information of an LCH in the configured BWP.

Optionally, the computer program is executed by the processor 1201 to implement: transmitting configuration request information of the preconfigured BWP resource to the terminal.

The configuration request information includes at least one of: a BWP index, a BWP index, and an LCH identity in the BWP.

Optionally, the computer program is executed by the processor 1201 to implement: transmitting the configuration request information of the preconfigured resource to the base station through a fourth preset message;

The fourth preset message includes at least one of: an MAC layer CE and an RRC message.

Optionally, the computer program is executed by the processor 1201 to implement: performing, in a case that the activation state configuration command includes an activation command, an activation configuration on the resource of the BWP according to the activation command; or performing, in a case that the activation state configuration command includes a deactivation command, a deactivation configuration on the resource of the BWP according to the deactivation command.

The terminal 1200 may implement various processes implemented by the terminal in the foregoing embodiments and details are not described herein again to avoid repetition.

According to the terminal in the embodiment of the present disclosure, an activation state configuration command of a preconfigured BWP resource transmitted by a base station is received; the resource of the BWP according to the activation state configuration command is configured, thereby achieving the state control of the BWP, improving the communication process, and guaranteeing the reliability of network communication.

As shown in FIG. 13 to FIG. 16, a base station is provided in an embodiment of the present disclosure, including:

a second transmission module 1301, configured to transmit an activation state configuration command of a preconfigured bandwidth part (BWP) resource.

Specifically, the second transmission module 1301 is configured to:

transmit the activation state configuration command of the preconfigured BWP resource to a terminal through a first preset message.

The first preset message includes at least one of: a Medium Access Control (MAC) layer control element (CE) and a Radio Resource Control (RRC) message.

Optionally, the base station further includes:

a third transmission module 1302, configured to transmit first configuration information of the BWP to a terminal.

The preconfigured BWP resource includes: the resource of the bandwidth part (BWP) used for uplink and/or downlink data transmission; the first configuration information includes at least one of: timing duration of a timer, a BWP index, a BWP cell index, and a frequency domain location of the BWP.

Specifically, the third transmission module 1302 is configured to:

transmit the first configuration information to the terminal through a second preset message;

The second preset message includes at least one of: an MAC layer CE, an RRC message, Packet Data Convergence Protocol (PDCP) control signaling and physical layer indication signaling.

Optionally, in a case that the second preset message is the MAC layer CE, the MAC layer CE includes: an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

Optionally, in a case that the second preset message is the MAC layer CE, the MAC layer CE includes:

an indication bit configured to indicate the timing duration of the timer, an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

Optionally, the base station further includes:

a fourth transmission module 1303, configured to transmit second configuration information of the BWP to a terminal;

The preconfigured BWP resource includes: a Logical Channel (LCH) resource of the resource of the BWP, the second configuration information includes at least one of: timing duration of a timer, a BWP index, a BWP cell index, an LCH identity in the BWP, bitmap information and a frequency domain location of the BWP.

Specifically, the fourth transmission module 1303 is configured to:

transmit the second configuration information to the terminal through a third preset message;

The third preset message includes at least one of: an MAC layer CE, an RRC message, PDCP control signaling and physical layer indication signaling.

Optionally, in a case that the third preset message is the MAC layer CE, a format of the MAC layer CE includes:

an indication bit configured to indicate the BWP index, an indication bit configured to indicate the BWP cell index, an indication bit configured to indicate the LCH identity and an indication bit configured to indicate an activation state of the BWP; a data portion carrying information related to an MAC layer CE header.

Optionally, in a case that the third preset message is the MAC layer CE, a format of the MAC layer CE includes:

an indication bit configured to indicate the LCH identity and an indication bit configured to indicate the BWP index; a data portion carrying bitmap information of an LCH in the configured BWP.

Optionally, the base station further includes:

a fourth reception module 1304, configured to receive configuration request information of the preconfigured BWP resource transmitted by a terminal.

Specifically, the configuration request information includes at least one of: a BWP index, a BWP index, and an LCH identity in the BWP.

Specifically, the fourth reception module 1304 is configured to:

receive configuration request information of the preconfigured BWP resource transmitted by a terminal through a fourth preset message.

The fourth preset message includes at least one of: an MAC layer CE and an RRC message.

It should be noted that the embodiment of the base station is a terminal corresponding to the above-mentioned resource configuration method applied to the base station side. All implementations of the above embodiments are applicable to the embodiment of the base station, and the same technical effects may be achieved.

A base station is provided in an embodiment of the present disclosure, including: a storage, a processor and a computer program stored in the storage and executable on the processor, the computer program is executed by the processor to implement various processes in the foregoing resource configuration method embodiment applied at a base station side, and the same technical effect may be achieved, which will not be repeated herein to avoid repetition.

A computer readable storage medium is further provided in an embodiment of the present disclosure, wherein the computer program is stored on the computer readable storage medium, and the computer program is executed by a processor to implement various processes in the foregoing resource configuration method embodiment applied at a base station side, and the same technical effect may be achieved, which will not be repeated herein to avoid repetition. The computer readable storage medium may be a ROM, a RAM, a magnetic disk, or an optical disk, etc.

Figure 17:
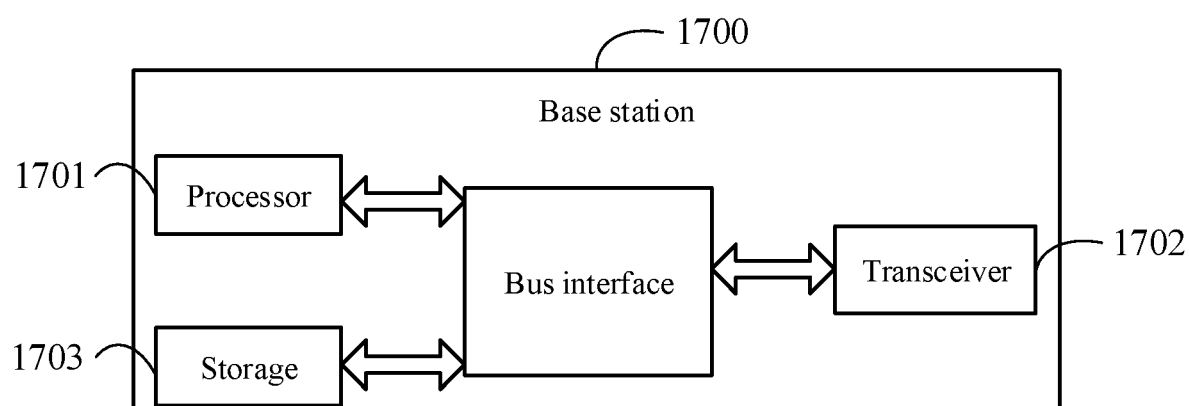
FIG. 17 is a structural diagram of a base station in an embodiment of the present disclosure.

FIG. 17 is a structural diagram illustrating a base station in an embodiment of the present disclosure, which may implement the details of the resource configuration method applied at a base station side, and the same technical effect may be achieved. As shown in FIG. 17, the base station 1700 includes: a processor 1701, a transceiver 1702, a storage 1703 and a bus interface.

The processor 1701 is configured to read the program in the storage 1703 and execute the following process: transmitting, through the transceiver 1702, an activation state configuration command of a preconfigured bandwidth part (BWP) resource;

In FIG. 17, a bus architecture may include any number of interconnected buses and bridges. Various circuits, specifically, one or more processors represented by the processor 1701 and a storage represented by the storage 1703, are linked together. The bus architecture may also link various other circuits such as peripherals, voltage regulators and power management circuits, which are well known in the art, and therefore a further description is omitted herein. The bus interface provides interfaces. The transceiver 1702 may be a plurality of elements, that is, includes a transmitter and a receiver, to provide units configured to communicate with various other apparatuses over a transmission medium.

The processor 1701 is responsible for managing the bus architecture and general processing, and the storage 1703 may store data used by the processor 1701 when performing operations.

Optionally, the processor 1701 is configured to read the program in the storage 1703 and execute the following process: transmitting the activation state configuration command of the preconfigured BWP resource to a terminal through a first preset message.

The first preset message includes at least one of: a Medium Access Control (MAC) layer control element (CE) and a Radio Resource Control (RRC) message.

Optionally, the processor 1701 is configured to read the program in the storage 1703 and execute the following process: transmitting first configuration information of the BWP to a terminal through the transceiver 1702;

The preconfigured BWP resource includes: the resource of the bandwidth part (BWP) used for uplink and/or downlink data transmission; the first configuration information includes at least one of: timing duration of a timer, a BWP index, a BWP cell index, and a frequency domain location of the BWP.

Optionally, the processor 1701 is configured to read the program in the storage 1703 and execute the following process: transmitting the first configuration information to the terminal through a second preset message.

The second preset message includes at least one of: an MAC layer CE, an RRC message, Packet Data Convergence Protocol (PDCP) control signaling and physical layer indication signaling.

Further, in a case that the second preset message is the MAC layer CE, the MAC layer CE includes: an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

Further, in a case that the second preset message is the MAC layer CE, the MAC layer CE includes:

an indication bit configured to indicate the timing duration of the timer, an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

Optionally, the processor 1701 is configured to read the program in the storage 1703 and execute the following process: transmitting second configuration information of the BWP to a terminal through the transceiver 1702;

The preconfigured BWP resource includes: a Logical Channel (LCH) resource of the resource of the BWP, the second configuration information includes at least one of: timing duration of a timer, a BWP index, a BWP cell index, an LCH identity in the BWP, bitmap information and a frequency domain location of the BWP.

Optionally, the processor 1701 is configured to read the program in the storage 1703 and execute the following process: transmitting the second configuration information to the terminal through a third preset message.

The third preset message includes at least one of: an MAC layer CE, an RRC message, PDCP control signaling and physical layer indication signaling.

Further, in a case that the third preset message is the MAC layer CE, a format of the MAC layer CE includes:

an indication bit configured to indicate the BWP index, an indication bit configured to indicate the BWP cell index, an indication bit configured to indicate the LCH identity and an indication bit configured to indicate an activation state of the BWP; a data portion carrying information related to an MAC layer CE header.

Further, in a case that the third preset message is the MAC layer CE, a format of the MAC layer CE includes:

an indication bit configured to indicate the LCH identity and an indication bit configured to indicate the BWP index; a data portion carrying bitmap information of an LCH in the configured BWP.

Optionally, the processor 1701 is configured to read the program in the storage 1703 and execute the following process: receiving, through the transceiver 1702, configuration request information, transmitted by a terminal, of the preconfigured BWP resource.

The configuration request information includes at least one of: a BWP index, a BWP index, and an LCH identity in the BWP.

Optionally, the processor 1701 is configured to read the program in the storage 1703 and execute the following process: receiving configuration request information, transmitted by a terminal through a fourth preset message, of the preconfigured BWP resource.

The fourth preset message includes at least one of: an MAC layer CE and an RRC message.

According to the base station of the embodiment of the present disclosure, the activation state configuration command of the preconfigured BWP resource is transmitted to the terminal, thereby achieving the state control of the BWP, improving the communication process, and guaranteeing the reliability of network communication.

Each embodiment in this specification is described in a progressive manner. Each embodiment focuses on the differences from other embodiments, and the same or similar parts between the various embodiments may refer to each other.

Those skilled in the art will appreciate that the embodiment of the present disclosure may be provided as a method, an apparatus, or a computer program product. Accordingly, the embodiment of the present disclosure may take the form of an entirely hardware embodiment, an entirely software embodiment, or an embodiment combining software and hardware aspects. Moreover, the embodiment of the present disclosure may use the form of the product of computer programs to be carried out on one or more computer usable storage medium (including but not limit to disk memory, Compact Disc Read-Only Memory (CD-ROM), optical memory etc.) comprising programming codes that may be executed by computers.

The embodiment of the present disclosure is described with reference to flowchart illustrations and/or block diagrams of methods, terminal device (systems) and computer program products according to the embodiment of the disclosure. It will be understood that each flow and/or block of flowcharts and/or block diagrams and a combination of the flows and/or blocks in the flowcharts and/or block diagrams may be implemented by computer program instructions. These computer program instructions may be provided to a processor of a general purpose computer, a special purpose computer, an embedded processor or other programmable data processing terminal device to produce a machine, so that the instructions executed by a processor of a computer or other programmable data processing terminal device are cause to produce a device for implementing the functions designated in one or more flows of the flowcharts or in one or more blocks of the block diagrams.

The computer program instructions may also be stored in a computer readable storage that may direct a computer or other programmable data processing terminal device to operate in a particular manner, such that instructions stored in the computer readable storage produce an article of manufacture including the instruction device, and the instruction device implements the functions designated in one or more flows of the flowcharts or in one or more blocks of the block diagrams.

These computer program instructions may also be loaded onto a computer or other programmable data processing terminal device such that a series of operational steps are performed on the computer or other programmable terminal device to produce computer-implemented processing, such that the instructions executed on a computer or other programmable terminal device provide steps for implementing the functions designated in one or more flows of the flowcharts or in one or more blocks of the block diagrams.

Although optional embodiments of the present disclosure are already described, once those skilled in the art understand basic creative concept, they may make additional modification and alteration for these embodiments. Therefore, the appended claims are intended to be construed as including alternate embodiments and all changes and modifications that fall within the scope of the embodiment of the present disclosure.

It should also be noted that, in this context, relational terms such as first and second, etc. are used merely to distinguish one entity or operation from another, and it does not necessarily require or imply any such actual relationship or order between these entities or operations. Furthermore, the terms "comprises" or "comprising" or "including" or any other variations are intended to encompass a non-exclusive inclusion, such that a process, method, article, or terminal device that includes a plurality of elements includes not only those elements but also other elements not explicitly listed, or elements that are inherent to such a process, method, article, or terminal device. An element defined by the phrase "comprising a . . . " does not exclude the presence of additional identical elements in the process, method, article, or terminal device that comprises the element, without further limitation.

The above are only some embodiments of the present disclosure, and it should be noted that those skilled in the art may also make several improvements and refinements without departing from the principles of the present disclosure, which should also fall within the scope of the present disclosure.

What is claimed is:

1. A base station, comprising a storage, a processor, and a program stored in the storage and executable on the processor, wherein the program is executed by the processor to perform:
    transmitting an activation state configuration command of a preconfigured bandwidth part (BWP) resource;
    wherein prior to transmitting the activation state configuration command of the preconfigured BWP resource, the program is executed by the processor to perform:
    transmitting first configuration information of the BWP to a terminal;
    wherein the preconfigured BWP resource comprises: the resource of the BWP used for uplink and/or downlink data transmission; the first configuration information comprises at least one of: timing duration of a timer, a BWP index, a BWP cell index, or a frequency domain location of the BWP.

2. The base station according to claim 1, wherein the program is executed by the processor to perform:
    transmitting the activation state configuration command of the preconfigured BWP resource to a terminal through a first preset message;
    wherein the first preset message comprises at least one of: a Medium Access Control (MAC) layer control element (CE) and a Radio Resource Control (RRC) message.

3. The base station according to claim 1, wherein the program is executed by the processor to perform:
    transmitting the first configuration information to the terminal through a second preset message;
    wherein the second preset message comprises at least one of: an MAC layer CE, an RRC message, a Packet Data Convergence Protocol (PDCP) control signaling and a physical layer indication signaling.

4. The base station according to claim 3, wherein in a case that the second preset message is the MAC layer CE, the MAC layer CE comprises:
    an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

5. The base station according to claim 3, wherein in a case that the second preset message is the MAC layer CE, the MAC layer CE comprises:
    an indication bit configured to indicate the timing duration of the timer, an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

6. The base station according to claim 1, wherein prior to transmitting the activation state configuration command of the preconfigured BWP resource, the program is executed by the processor to perform:
    transmitting second configuration information of the BWP to a terminal; wherein the preconfigured BWP resource comprises: a Logical Channel (LCH) resource of the resource of the BWP, the second configuration information comprises at least one of: timing duration of a timer, a BWP index, a BWP cell index, an LCH identity in the BWP, bitmap information and a frequency domain location of the BWP.

7. The base station according to claim 1, wherein prior to transmitting the activation state configuration command of the preconfigured BWP resource, the program is executed by the processor to perform:
receiving configuration request information of the preconfigured BWP resource transmitted by a terminal.

8. A non-transitory computer readable storage medium storing a computer program, wherein the computer program is executed by a processor to perform:
receiving an activation state configuration command of a preconfigured bandwidth part (BWP) resource transmitted by a base station;
configuring the preconfigured BWP resource according to the activation state configuration command;
wherein the receiving the activation state configuration command of the preconfigured BWP resource transmitted by the base station comprises:
receiving the activation state configuration command of a BWP resource used for uplink and/or downlink data transmission transmitted by the base station;
prior to receiving the activation state configuration command of the resource of the BWP used for the uplink and/or downlink data transmission transmitted by the base station, the method further comprises:
receiving first configuration information of the BWP transmitted by the base station;
wherein the first configuration information comprises at least one of: timing duration of a timer, a BWP index, a BWP cell index, or a frequency domain location of the BWP.

9. The non-transitory computer readable storage medium according to claim 8, wherein the computer program is executed by the processor to perform:
receiving the activation state configuration command of the preconfigured BWP resource transmitted by the base station through a first preset message;
wherein the first preset message comprises at least one of: a Medium Access Control (MAC) layer control element (CE) and a Radio Resource Control (RRC) message.

10. The non-transitory computer readable storage medium according to claim 8, wherein the computer program is executed by the processor to perform:
starting the timer according to the timing duration of the timer in a case that the first configuration information comprises the timing duration of the timer;
configuring the resource of the BWP according to the activation state configuration command when the timer expires.

11. The non-transitory computer readable storage medium according to claim 8, wherein the computer program is executed by the processor to perform:
receiving the first configuration information transmitted by the base station through a second preset message;
wherein the second preset message comprises at least one of: an MAC layer CE, an RRC message, a Packet Data Convergence Protocol (PDCP) control signaling and a physical layer indication signaling.

12. The non-transitory computer readable storage medium according to claim 11, wherein in a case that the second preset message is the MAC layer CE, the MAC layer CE comprises:
an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

13. The non-transitory computer readable storage medium according to claim 11, wherein in a case that the second preset message is the MAC layer CE, the MAC layer CE comprises:
an indication bit configured to indicate the timing duration of the timer, an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

14. The non-transitory computer readable storage medium according to claim 8, wherein the computer program is executed by the processor to perform:
receiving an activation state configuration command of a Logical Channel (LCH) resource of a BWP resource transmitted by the base station;
prior to receiving the activation state configuration command of the Logical Channel (LCH) resource of the resource of the BWP transmitted by the base station, the method further comprises:
receiving second configuration information of the BWP transmitted by the base station;
wherein the second configuration information comprises at least one of: timing duration of a timer, a BWP index, a BWP cell index, an LCH identity in the BWP, bitmap information and a frequency domain location of the BWP.

15. The non-transitory computer readable storage medium according to claim 8, wherein prior to receiving the activation state configuration command of the preconfigured BWP resource transmitted by the base station, the computer program is executed by the processor to perform:
transmitting configuration request information of the preconfigured BWP resource to the terminal.

16. The non-transitory computer readable storage medium according to claim 8, wherein the computer program is executed by the processor to perform:
performing, in a case that the activation state configuration command comprises an activation command, an activation configuration on the resource of the BWP according to the activation command; or
performing, in a case that the activation state configuration command comprises a performing, in a case that the activation state configuration command comprises a deactivation command, a deactivation configuration on the resource of the BWP according to the deactivation command.

17. A non-transitory computer readable storage medium storing a computer program, wherein the computer program is executed by a processor to perform:
transmitting an activation state configuration command of a preconfigured bandwidth part (BWP) resource;
wherein prior to transmitting the activation state configuration command of the preconfigured BWP resource, the method further comprises:
transmitting first configuration information of the BWP to a terminal;
wherein the preconfigured BWP resource comprises: the resource of the BWP used for uplink and/or downlink data transmission; the first configuration information comprises at least one of: timing duration of a timer, a BWP index, a BWP cell index, or a frequency domain location of the BWP.

18. The non-transitory computer readable storage medium according to claim 17, wherein the computer program is executed by the processor to perform:
transmitting the activation state configuration command of the preconfigured BWP resource to a terminal through a first preset message;
wherein the first preset message comprises at least one of: a Medium Access Control (MAC) layer control element (CE) and a Radio Resource Control (RRC) message.

19. The non-transitory computer readable storage medium according to claim 18, wherein the computer program is executed by the processor to perform:
transmitting the first configuration information to the terminal through a second preset message;
wherein the second preset message comprises at least one of: an MAC layer CE, an RRC message, a Packet Data Convergence Protocol (PDCP) control signaling and a physical layer indication signaling.

20. The non-transitory computer readable storage medium according to claim 19, wherein in a case that the second preset message is the MAC layer CE, the MAC layer CE comprises:
an indication bit configured to indicate the BWP index, an indication bit configured to indicate the BWP cell index, an indication bit configured to indicate uplink and downlink indication information and an indication bit configured to indicate an activation state of the BWP; a data portion carrying information related to an MAC layer CE header.

* * * * *